(12) United States Patent
Wang

(10) Patent No.: US 8,240,858 B2
(45) Date of Patent: Aug. 14, 2012

(54) PROTECTIVE COVER MODULE FOR LENS

(75) Inventor: Mo-Jing Wang, Shenzhen (CN)

(73) Assignees: Shenzhen Futaihong Precision Industry Co., Ltd., ShenZhen, Guangdong Province (CN); FIH (Hong Kong) Limted, Kowloon (HK)

( * ) Notice: Subject to any disclaimer, the term of this patent is extended or adjusted under 35 U.S.C. 154(b) by 311 days.

(21) Appl. No.: 12/720,787

(22) Filed: Mar. 10, 2010

(65) Prior Publication Data

US 2011/0043913 A1 Feb. 24, 2011

(30) Foreign Application Priority Data

Aug. 21, 2009 (CN) .......................... 2009 1 0305899

(51) Int. Cl.
*G02B 23/16* (2006.01)

(52) U.S. Cl. ...................................... 359/511; 455/575.8
(58) Field of Classification Search .................. 359/511; 455/575.1, 575.3, 575.4, 575.8
See application file for complete search history.

(56) References Cited

U.S. PATENT DOCUMENTS 7,515,930 B2 * 4/2009 Eromaki .................... 455/550.1
* cited by examiner

*Primary Examiner* — Euncha Cherry
(74) *Attorney, Agent, or Firm* — Altis Law Group, Inc.

(57) ABSTRACT

A protective cover module includes a housing, a first positioning element, a second positioning element, and a plate. The housing defines a receiving hole. The second positioning element attaches to the housing and attracts the first positioning element positioning element by magnetic force. The plate slidably attaches to the housing, and configured to mount the first positioning element and cover the receiving hole.

7 Claims, 5 Drawing Sheets

PROTECTIVE COVER MODULE FOR LENS

BACKGROUND

1. Technical Field

The disclosure generally relates to device protection, and particularly to a protective cover module for a lens used in a portable electronic device.

2. Description of Related Art

Portable electronic devices providing a camera function are widely used. The camera, though, is often exposed to dust and water, the effects of which can decrease the device's lifetime.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the protective cover module. Moreover, in the drawings, like reference numerals designate corresponding parts throughout the several views, in which.

DETAILED DESCRIPTION

Figure 1:
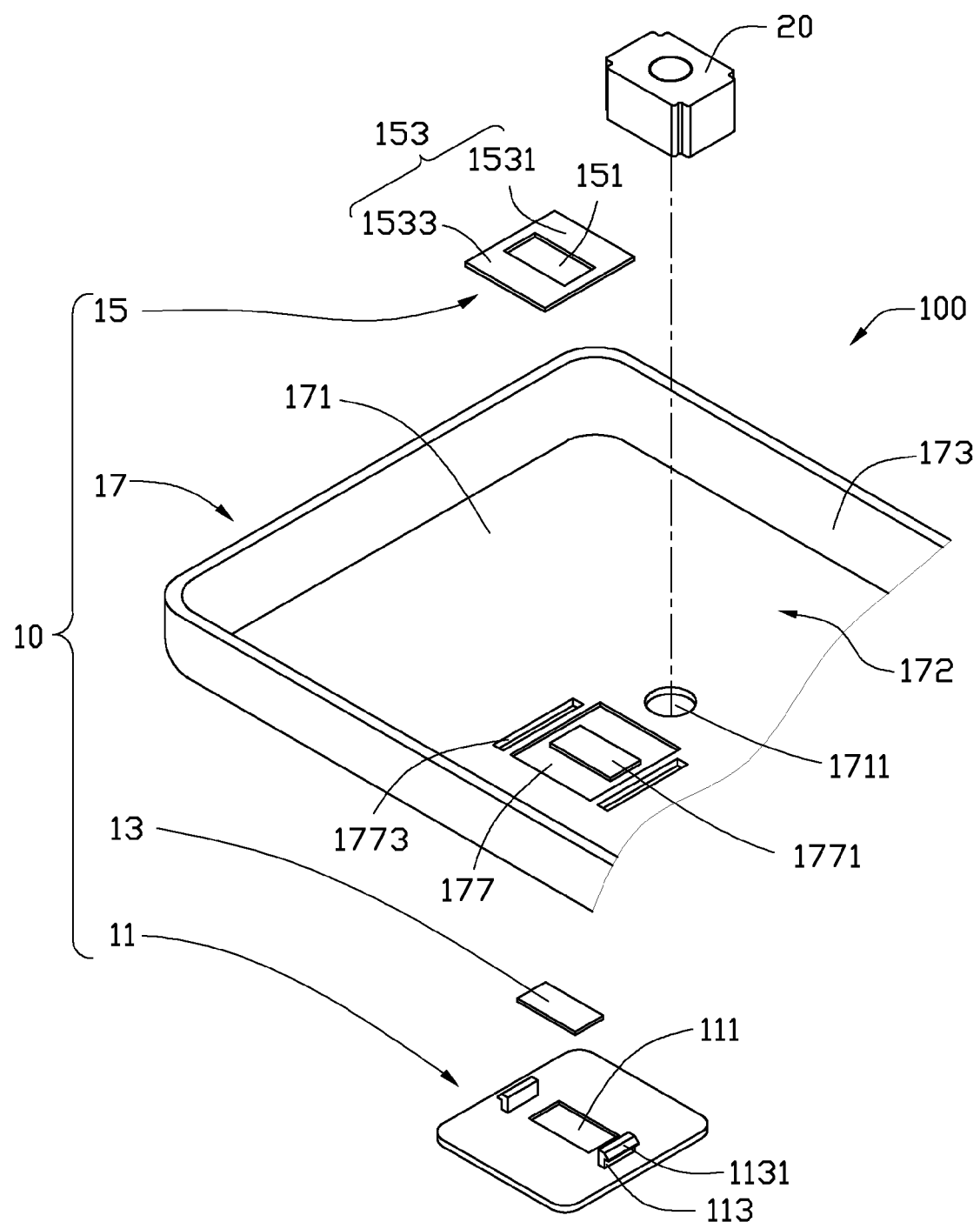
FIG. 1 is an exploded, isometric view of an exemplary embodiment of a portable electronic device with a protective cover module.

FIG. 1 shows an exemplary embodiment of a lens cover module 10 used in a portable electronic device 100 such as a cellular phone or any electronic device. The portable electronic device 100 has a lens 20. The protective cover module 10 covers and protects the lens 20.

The protective cover module 10 includes a plate 11 for covering the lens 20, a first positioning element 13 mounted on the plate 11, a second positioning element 15 attached to the first positioning element 13, and a housing 17. The plate 11 is slidably mounted on the housing 17 and selectively covers or exposes the lens 20. The plate 11 defines an aperture 111 therein to receive the first positioning element 13. Two spaced hooks 113 extend upwards from plate 11 adjacent to the aperture 111. Each hook 113 has a resisting protrusion 1131 of elastic material at a distal end thereof. The first positioning element 13 is an approximately rectangular plate of magnetic material. The second positioning element 15 is an approximately rectangular plate, and may be attracted by the first positioning element 13 by magnetic force. In this exemplary embodiment, the second positioning element 15 is made of iron. The second positioning element 15 defines a through hole 151 in a middle area and forms a first positioning portion 1531 and a second positioning portion 1533 at two sides of the through hole 151.

The housing 17 includes a base plate 171 and a sidewall 173 surrounding the base plate 171. The base plate 171 and the sidewall 173 cooperatively surround a cavity 172. The base plate 171 defines a receiving hole 1711 therein through which light can enter housing 17 and reach lens 20. The base plate 171 defines a receiving groove 177 adjacent to the receiving hole 1711 and forms a block 1771 in the receiving groove 177. The block 1771 is received in the through hole 151 such that the second positioning element 15 is attached to the housing 17. In the exemplary embodiment, the size and shape of the block 1771 is approximately the same as the size and shape of the first positioning element 13. Thus, when the first positioning element 13 faces the block 1771, little magnetic attraction occurs between the first positioning element 13 and the second positioning element 15. The base plate 171 defines two spaced slots 1773, one at each side of the receiving groove 177. The slots 1773 can accommodate the hooks 113 of the plate 11.

Figure 2:
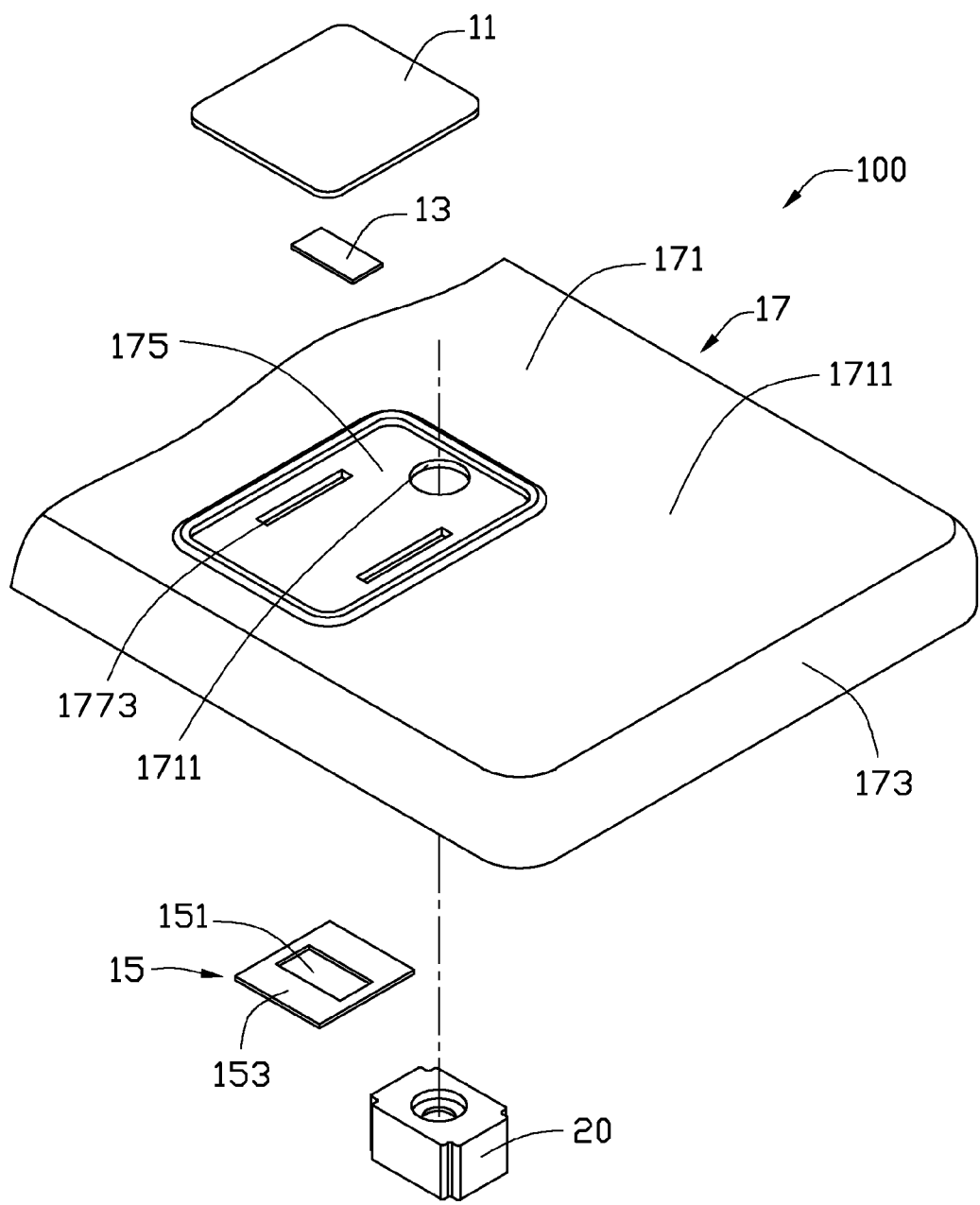
FIG. 2 is similar to FIG. 1, but viewed from another aspect.

FIG. 2 shows the portable electronic device 100 from another aspect, wherein housing 17 defines a recess 175 therein to receive the plate 11. The recess 175 communicates with the receiving hole 1711 and the slots 1773. The length of the recess 175 is substantially the same shape as the plate 11 so that the plate 11 can cover or expose the receiving hole 1711 selectively.

Figure 3:
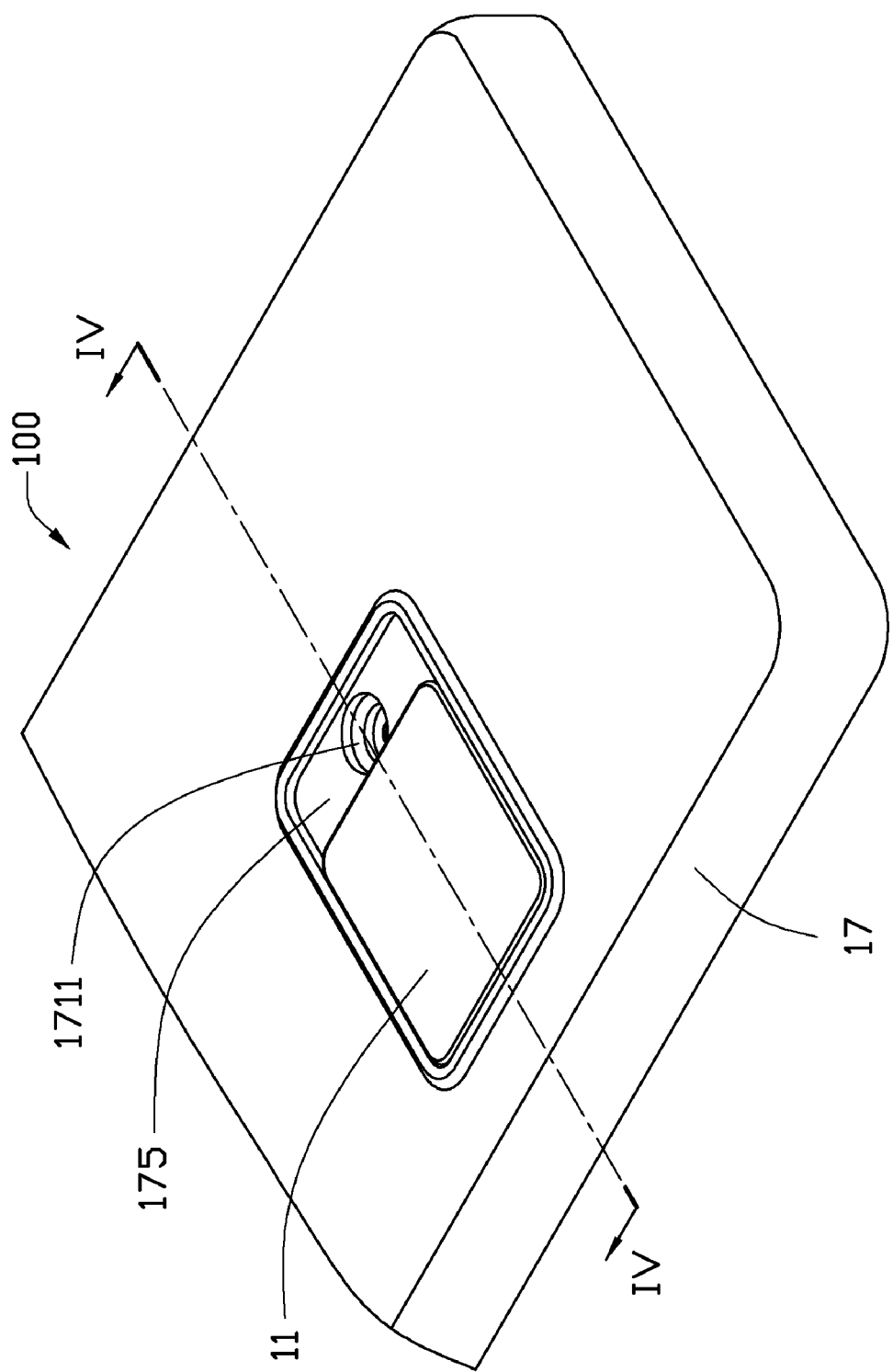
FIG. 3 is an assembled, isometric view of the portable electronic device showing in FIG. 2.
Figure 4:
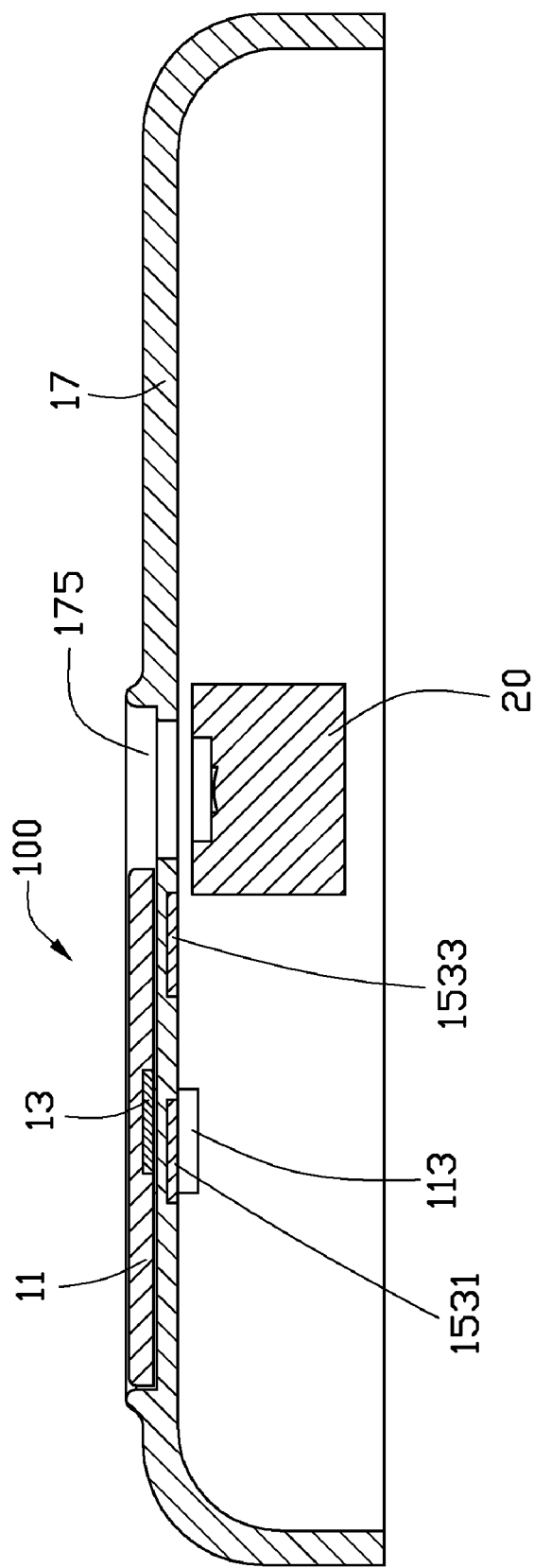
FIG. 4 is a cross-section of the portable electronic device of FIG. 3 along IV-IV line.

During assembly of the portable electronic device 100, the first positioning element$_{[A1]}$13 is received in the aperture 111 and the first positioning element 13 fixed in the plate 11. In this exemplary embodiment, the first positioning element 13 and the plate 11 are attached by, e.g., welding. Then, the plate 11 having the first positioning element 13 is mounted on the housing 17 by the resisting protrusions 1131 being received in the corresponding receiving grooves 177. After assembly, the plate 11 can slide along the receiving grooves 177 and the resisting protrusions 1131 resists the base plate 171. The second positioning element 15 is located and fixed on the housing 17 by the engagement of the block 1771 and the through hole 151. Finally, lens 20 and receiving hole 1711 are aligned, and lens 20 fixed on the housing 17. Assembly of portable electronic device 100 is complete, as shown in FIG. 3.

Figure 5:
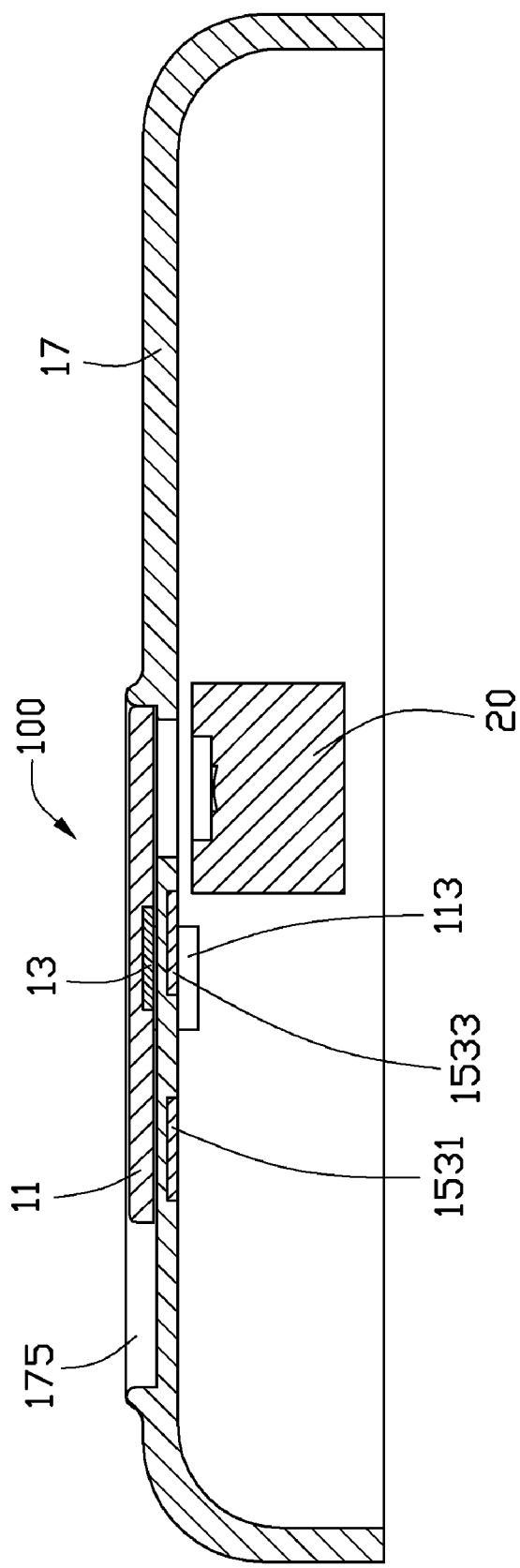
FIG. 5 is similar to FIG. 4, but show the cover module in a closed state.

Referring to FIGS. 5 and 6, in use, the plate 11 is slid away from receiving hole 1711. Magnetic force between the first positioning element 13 and the second positioning element 15 moves the plate 11 until the plate resists the housing 17, whereby the receiving hole 1711 is exposed to admit light through lens 20. At the same time, magnetic force between the first positioning element 13 and the first portion 1531 of the second positioning element 15 maintain the plate 11 on the housing 17.

After use, plate 11 is slid towards receiving hole 1711. Magnetic force between the first positioning element 13 and the second positioning portion 153 of the second positioning element 15 moves the plate 11 to resist the housing 17, whereby receiving hole 1711 is covered and lens 20 protected.

It is notable that one of the positioning elements 13, 15 may be of soft magnetic material, and that plate 11 is not limited to covering the receiving hole 1711 to protect the lens 20, but can be configured to act as a connector or the like. Additionally, the number of hooks 113 and slots 1773 can be less or more than two.

The portable electronic device 100 is easy to use via magnetic force between the positioning elements 13, 15. As well, location of plate 11 by magnetic force increases lifetime of the device 100.

It is believed that the present embodiments and their advantages will be understood from the foregoing description, and it will be apparent that various changes may be made thereto without departing from the spirit and scope of the disclose or sacrificing all of its material advantages, the examples hereinbefore described merely being preferred or exemplary embodiments of the disclose.

What is claimed is:

1. A protective cover module comprising:
a housing defining a receiving hole, a lens exposed from the receiving hole, a receiving groove defined at one side of the housing and a recess defined at another opposite side of the housing;
a plate defining an aperture;
a first positioning element fixed in the aperture of the plate;
a second positioning element latched in the receiving groove of the housing and positioned under the first positioning element, the second positioning element defining a first positioning portion and a second positioning portion;
a plate with the first positioning element slidably attached to the recess of the housing, the first positioning portion and the second positioning portion attracted to the first positioning element by magnetic force to selectively cover or expose the lens in the receiving hole.

2. The protective cover module as claimed in claim 1, wherein the recess of the housing defines two slots therein, each slot is positioned at one side of the receiving groove, two hooks are formed on the plate and are slidably received in the corresponding slots.

3. The protective cover module as claimed in claim 2, wherein each hook forms a resisting protrusion of elastic material, resisting the housing.

4. The protective cover module as claimed in claim 1, wherein the second positioning element defines a through hole between first positioning portion and a second positioning portion, and a block is formed in the receiving groove; the block is received in the through hole.

5. The protective cover module as claimed in claim 4, wherein the size and shape of the first positioning element is approximately the same size and shape as the block.

6. A protective cover module comprising:
a housing defining a receiving hole, a lens exposed from the receiving hole, a receiving groove defined at one side of the housing and a recess defined at another opposite side of the housing;
a plate defining an aperture;
a first positioning element attached to the aperture of the plate;
a second positioning element including a first positioning portion and a second positioning portion, the second positioning element latched in the receiving groove of the housing, and positioned under the first positioning element;
wherein the plate with the first positioning element is slidably attached to the recess of the housing, the first positioning element selectively attracts the first positioning portion or the second positioning portion to expose or cover the receiving hole.

7. The protective cover module as claimed in claim 6, wherein the recess is longer than the plate.

* * * * *